March 3, 1970  D. L. A. HAND  3,498,871
LAMINATED TRANSPARENT ASSEMBLIES
Filed May 3, 1966
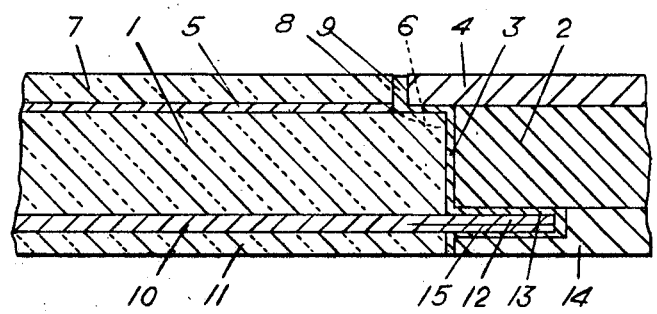
Inventor
Derek L. A. Hand
By Morrison, Kennedy & Campbell
Attorneys

United States Patent Office 3,498,871
Patented Mar. 3, 1970

3,498,871
LAMINATED TRANSPARENT ASSEMBLIES
Derek Lionel Augustus Hand, Alvechurch, England, assignor to Triplex Safety Glass Company Limited, London, England, a corporation of Great Britain
Filed May 3, 1966, Ser. No. 547,341
Claims priority, application Great Britain, May 5, 1955, 19,210/55
Int. Cl. B32b 1/04, 3/02, 17/06
U.S. Cl. 161—44                          2 Claims

ABSTRACT OF THE DISCLOSURE

An aircraft glass panel comprises a load-bearing glass pane sandwiched between a pair of glass protecting panes, each protecting pane being bonded to the adjacent surface of the load-bearing pane by a bonding layer of transparent plastics material, the outer bonding layer being not more than 0.1 inch thick and the inner bonding layer comprising an impact resistant layer.

---

This invention relates to laminated transparent assemblies, and is especially concerned with the construction of assemblies intended for use in aircraft, which aircraft experience in flight extremely low temperatures, e.g. of −40° C. or even lower.

At the present time framed assemblies forming glass panels (e.g. windscreens) for aircraft comprise essentially a load-bearing pane of glass bonded on its outer face to an impact resistant layer of ¼ inch or more in thickness usually extending beyond the load-bearing pane for attachment to the frame by means of bolts, the function of the impact resistant layer (usually a layer of plasticised polyvinyl butyral) being to retain pressurisation in the aircraft in the event of impact on, or fracture of, the load-bearing pane, from any cause, for example breakage due to bird impact.

Such usual constructions of assemblies have also generally included an outer protecting glass pane bonded the impact resistant layer of thick plastics.

Such an assembly also includes, on the inner face of the load-bearing pane, a second but less thick plastics layer as compared with the outer impact resistant layer and an inner protecting glass pane, this second layer holding together the inner protecting glass and the load-bearing pane.

Development in aircraft construction to achieve higher and higher speeds and altitudes of flight has required progressive increase in the thickness of the load-bearing pane, and also increases in the thickness of the impact resistant layer between the load-bearing pane and the outer protecting glass pane, which layer can be ¼ inch or more in thickness.

Polyvinyl butyral has a co-efficient of expansion at least ten times that of glass and so, the thicker the impact resistant layer, the greater the stresses developed at the interfaces between the load-bearing pane and the outer impact resistant layer and between the outer protecting glass and the impact resistant layer, when exposed to extreme exterior cold conditions.

Experience has shown that the stresses set up will cause the glass surfaces adjacent the thick impact resistant layer to flaw, particularly at the junction of said surfaces with the contiguous edge faces of the glass panes, and that such harmful stresses also may lead to a breakdown in the bonds between the load-bearing pane and the outer impact resistant layer and between the outer protecting glass and this impact resistant layer.

Further increases in the thickness of the impact resistant layer become necessary to withstand impacts as this speeds attained at low altitudes increase, and the greater thickness will in turn increase the harmful stresses which arise at high altitudes and low temperatures, and such greater thickness is therefore impractical.

The main object of the present invention is to devise an improved laminated transparent assembly which will stand up to all these conditions.

A laminated transparent assembly intended for use in panels on aircraft, constructed according to the present invention, is characterised by a load-bearing glass pane, a bonding layer of transparent plastics material between the outer face of the load-bearing pane and an outer glass protecting pane, the bonding layer being sufficiently thin, not more than 0.1 inch thick, to avoid development of harmful stresses in the adjacent glass and an impact resistant layer of transparent plastics material between the inner face of the load-bearing pane and an inner protecting glass pane and bonding the inner pane to the load-bearing pane.

The outer glass protecting pane and the inner protecting glass pane may consist of a number of glass laminations fixed together by adhesive, or alternatively of a single pane of toughened glass, or of a single pane of untoughened glass.

In a laminated assembly constructed according to the present invention, owing to the thinness of the outer bonding layer, the difference in contraction between the bonding layer and the load-bearing pane is unlikely to generate a gross stress sufficient to harm the load-bearing pane in any way, even at the most extreme low temperature (e.g. −40° C. or lower) encountered in modern flight, or to cause separation of the bonding layer from the load-bearing pane.

It is found in practice that the junction of the major face of the load-bearing pane with the contiguous edge faces of the pane is particularly susceptible to the flawing and layer separation which can be caused by operation at low temperatures, and the present invention further includes constructions directed particularly to protecting the edge faces of the load-bearing pane.

From this aspect, the present invention provides a laminated transparent assembly suitable for use in panels on aircraft, characterised by in combination, a load-bearing glass pane, a bonding layer of transparent plastics material between the outer face of the load-bearing pane and an outer glass protecting pane, the bonding layer being sufficiently thin, not more than 0.1 inch thick to avoid development of harmful stresses in the adjacent glass, and the bonding layer being set back on the face of the load-bearing pane to eliminate the possibility of stresses reaching the junction of the said face and the contiguous edge-face of the load-bearing pane, and an impact resistant layer of transparent plastics material between the inner face of the load-bearing pane and an inner protecting glass pane.

As in constructions according to the invention, the bonding layer between the load-bearing pane and the outer glass element is so thin as to be unable to constitute an impact resistant layer, an impact resistant layer is provided on the inner face of the load-bearing pane as hereinafter described.

The thin bonding layer on the outer face of the load-bearing pane may be formed from polyvinyl butyral or, if the aircraft in which the assembly is installed is designed for supersonic flight, from a silicone material such as that silicone obtainable in the open market under the trademark Silastomer Type "K" (Dow Corning) such silicone layers being incorporated between the load-bearing pane and the outer glass protecting pane to withstand the heat generated by high speed flight.

In order that the invention may be more clearly understood, one preferred practical construction will now be described, by way of example, with reference to the accompanying diagrammatic drawing which shows a fragmental section, in plan, of an aircraft windscreen.

In the drawing a load-bearing pane 1 is shown enclosed by a spacer member 2 of a framework normally incorporated in the body of an aircraft to surround the pane 1, packing material 3 being interposed between the spacer member 2 and the pane 1.

On the outer side of the spacer member 2 is a cover strip 4 which overlaps the edges of the pane 1 juxtaposed of the spacer member 2 and overlies the outer face of the pane 1. In the preferred construction, the thin bonding layer 5 between the pane 1 and an outer glass protecting pane 7 is set back on the outer face of the pane 1 to be clear of the edge of the pane 1, and thus provides a rebate 8 to accept the cover strip 4. In addition, the setting back of the bonding layer 5 in the preferred construction affords further protection to the contiguous edge face regions of the pane 1, which edge face regions are particularly susceptible to flawing and layer separation at very low temperatures.

Normal flawing or chipping away from the edge is indicated by the broken line 6, which flawing or chipping occurs when an impact resistant layer exists as in the known art of assembling windscreen panels for aircraft instead of a thin bonding layer used in constructions according to the invention, i.e. a thin bonding layer, of not more than 0.1 inch thick as herein described.

In constructing an assembly according to the invention, the bonding layer 5 is not an impact resistant layer but merely a bonding layer between the pane 1 and an outer glass pane 7. The thin bonding layer 5 between the pane 7 and the load-bearing pane 1 is given a thickness not greater than 0.1 inch and, with this dimension, it is found that the pull on the face of the load-bearing pane 1 is not damaging and separation of the edge of the bonding layer 5 from pane 1 and outer glass pane 7 and flawing of the surface of the pane 1 and the outer glass pane 7 is practically eliminated.

A packing 9 of compressible material is inserted between the cover strip 4 and the juxtaposed edges of the bonding layer 5 and the outer glass pane 7.

An impact resistant layer 10 is provided in assemblies according to the present invention on the inner face of the pane 1 and to this impact resistant layer 10 is applied an inner protecting glass pane 11 which is conveniently of the same superficial dimensions as those of the pane 1. The impact resistant layer 10 has a greater superficial area than the pane 1 to overlie the inner face of the spacer member 2 and to provide a marginal extension 12 which is sealed against the spacer member 2 as indicated at 13 and clamped in position by a clamping plate 14 which latter is also in abutting relation with the inner protecting glass pane 11.

As indicated at 15, the extension 12 may be reinforced by metal inserts in the medial plane of the extension.

Because the impact resistant layer 10 is remote from the outer face of the aircraft in assemblies according to the present invention it is not subject to extreme low temperatures at high altitudes and may therefore be formed by a conventionally thick (of ¼ inch or more) layer of polyvinyl butyral, which material is believed to be the best adapted to secure the function of withstanding bird impact and pressurisation stresses at normal temperatures. At the same time the impact resistant layer 10 is not subjected to the high temperatures which accrue near the outer face during high speed flight.

It will be appreciated from the foregoing description that by the use of such a laminated assembly constructed in accordance with the present invention damage to the load-bearing pane arising from the existence of extremely low temperature conditions external to the aircraft in which the assembly is installed is entirely avoided while the advantage of employing plasticised polyvinyl butyral as an impact resistant layer is retained, this being the best material at present in use to withstand bird impact and pressurisation stresses.

I claim:
1. A laminated transparent assembly suitable for use in body panels of high altitude aircraft and exposed during normal flight of the aircraft to temperatures outside the aircraft substantially different from the temperatures inside the aircraft, comprising a relatively thick load bearing pane of glass and protective panes of glass thinner than the load bearing pane bonded one pane to each face of the load bearing pane by an intermediate layer of transparent organic plastics material different from glass in its coefficient of expansion, said bonding layer of transparent organic plastics material between the load bearing pane and the protective pane exposed to temperatures outside the aircraft being sufficiently thin, not more than 0.1 inch thick, to avoid development of harmful stresses in the adjacent glass during normal flight of the aircraft and said bonding layer of transparent organic plastics material between the load bearing pane and the protective pane exposed to temperatures inside the aircraft being sufficiently thick, not less than 0.25 inch thick, to act as an impact resistant layer during said normal flight.

2. A laminated transparent assembly according to claim 1 in which said bonding layer between the load-bearing pane and the outer glass protecting pane, is set back on the face of the load-bearing pane to eliminate the possibility of stresses reaching the junction of the said face and the contiguous edge face of the load-bearing pane.

References Cited
UNITED STATES PATENTS

| | | | |
|---|---|---|---|
| 1,748,080 | 2/1930 | Reece | 161—192 |
| 3,061,490 | 10/1962 | Ryan | 161—44 |

WILLIAM J. VAN BALEN, Primary Examiner

U.S. Cl. X.R.

156—106, 107; 161—149, 165, 193, 199

PO-1050
(5/69)

UNITED STATES PATENT OFFICE
CERTIFICATE OF CORRECTION

Patent No. 3,498,871            Dated March 3, 1970

Inventor(s)     Derek Lionel Augustus Hand

It is certified that error appears in the above-identified patent and that said Letters Patent are hereby corrected as shown below:

Column 1, line 7 "May 5, 1955" should read --May 6, 1965--

SIGNED AND SEALED
AUG 25 1970

(SEAL)
Attest:

Edward M. Fletcher, Jr.
Attesting Officer

WILLIAM E. SCHUYLER, JR.
Commissioner of Patents